E. W. VOGEL.
RAIL BOND.
APPLICATION FILED FEB. 9, 1906.
902,026.
Patented Oct. 27, 1908.
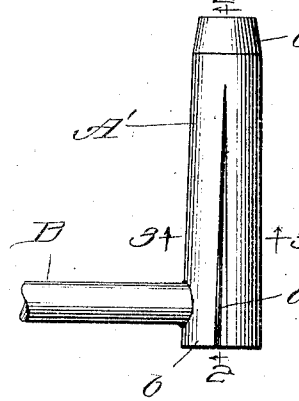
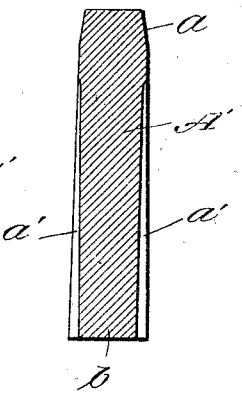
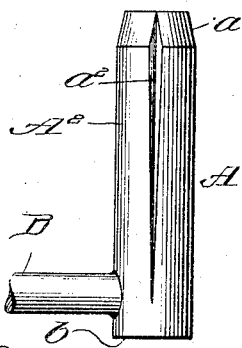
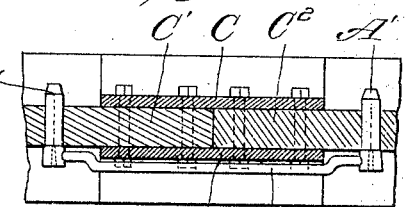
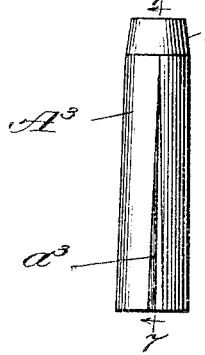
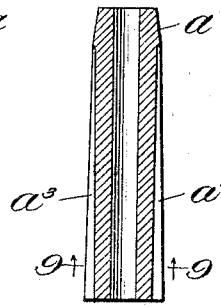
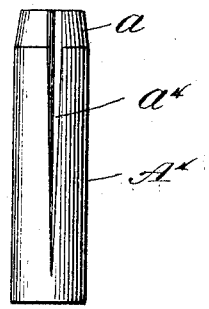
Witnesses:
Inventor:
Eugene W. Vogel
by Chamberlin & Wilkinson
attys

UNITED STATES PATENT OFFICE.

EUGENE W. VOGEL, OF CHICAGO, ILLINOIS, ASSIGNOR TO THE RAILROAD SUPPLY COMPANY, OF CHICAGO, ILLINOIS, A CORPORATION OF ILLINOIS.

RAIL-BOND.

No. 902,026.  Specification of Letters Patent.  Patented Oct. 27, 1908.

Application filed February 9, 1906. Serial No. 300,218.

*To all whom it may concern:*

Be it known that I, EUGENE W. VOGEL, a citizen of the United States, residing at Chicago, county of Cook, State of Illinois, have invented a certain new and useful Improvement in Rail-Bonds, and declare the following to be a full, clear, and exact description of the same, such as will enable others skilled in the art to which it pertains to make and use the same, reference being had to the accompanying drawings, which form a part of this specification.

My invention relates in general to an improvement in electrical bonds for uniting two conductors, such for instance as the adjacent ends of railroad rails, and more particularly to terminals uniting the ends of the bond to the conductors.

It is desirable in bonding rails that the terminals of the bond should be closely and securely united to the rails uniformly throughout the portions thereof within the holes in the rails to secure electrical connections having a minimum resistance.

In order that the terminals of the bond may be driven into holes in the rail or other conductors, it is customary to make them tapered or wedge-shaped. Practice has demonstrated that a tapered terminal when driven into a cylindrical hole does not form close electrical contact with the surface of the conductor around the hole owing to the difference in diameter of the portion of the terminal within the hole.

The primary object of my invention is to provide a terminal for an electric bond which may be readily driven into a cylindrical hole in a conductor and which will uniformly contact with the wall around the hole.

A further object of my invention is to provide a terminal for an electrical bond the outer surface of which will be displaced when driven thereby forming a uniform contact between the entire surface of the terminal within the hole and the wall surrounding the hole.

A still further object of my invention is to provide a bond for electrically uniting conductors which will be simple in construction, inexpensive in manufacture, and efficient in use.

My invention generally described consists of a terminal for an electrical bond having superficial grooves therein whereby when the terminal is driven into a hole in a conductor the portion of the terminal adjacent its surface will be displaced to permit the portion of the terminal within the hole to uniformly contact with the wall around the hole.

My invention further consists of an electrical bond provided with integral terminals at the ends thereof having superficial grooves therein so that the terminals when driven into holes in the conductors will uniformly contact with the surfaces of the conductors around the holes.

My invention will be more fully described hereinafter with reference to the accompanying drawing in which the same is illustrated as embodied in several practical forms, and in which Figure 1 is an elevational view of a portion of a bond with a terminal secured thereto; Fig. 2 a sectional view on line 2—2 Fig. 1; Fig. 3 a cross section on line 3—3 Fig. 2, showing the terminal provided with a coating; Fig. 4 a view similar to Fig. 1 of a modification; Fig. 5 a view on a reduced scale showing a bond in position uniting the adjacent ends of the rails of the track; Fig. 6 an elevational view of a modification; Fig. 7 a sectional view on line 7—7 Fig. 6; Fig. 8 a view similar to Fig. 6 showing still another modification and Fig. 9 a sectional view on line 9—9 Fig. 7.

Similar reference characters are used to designate similar parts in the several figures of the drawing.

Referring more particularly to Figs. 1, 2 and 3 reference character A' indicates one terminal of a bond B. The terminal is provided with a bevel $a$ at one end thereof and is slightly tapered to facilitate its being driven into a cylindrical hole in a conductor. The surface of the terminal A' is provided with one or more grooves $a'$ preferably tapered in width and depth in the same direction in which the terminal is tapered.

In Fig. 4 the terminal $A^2$ is shown as cylindrical and provided with a beveled end $a$. One or more grooves $a^2$ are in the surface of the terminal $A^2$ such grooves being tapered in width and depth and decreasing in cross section from the beveled end $a$ towards the driving head $b$.

The bond may be conveniently formed integrally with terminals, such as shown in Fig. 1 or Fig. 4. The terminals may be formed on the ends of the bond by upsetting or forging. The terminals are provided with driving heads b by means of which they may be readily driven into the holes in the conductors which are to be bonded. In Fig. 5 I have shown the terminals A' A' on the bond B' driven into holes in the adjacent ends of the rails C' C². C indicates the usual fish plates for forming the joint between the rails.

My invention may be embodied in various types of terminals and in Figs. 6 to 9 I have shown it as applied to the well known channel pins which are placed around the ends of a bonding wire and driven into holes in the adjacent ends of rails or other conductors. In Fig. 6 the channel pin $A^3$ is shown as provided with a beveled end $a$ and with one or more superficial grooves $a^3$ of tapered width and depth conforming to the taper of the pin. In Fig. 7 the grooves $a^3$ are shown as two in number but it is obvious that one or more of such grooves may be provided in the pin.

In Fig. 8 I have shown my invention as applied to a channel pin $A^4$ of cylindrical form and provided with the usual beveled end $a$. One or more grooves $a^4$ are provided in the surface of the pin, such grooves being tapered in width and depth from the beveled end towards the driving end.

When the terminal is cylindrical in form and either solid as shown in Fig. 1 or channeled as shown in Figs. 6, 7 and 9, the beveled end $a$ is inserted in a hole in the rail or other conductor and power in the form of blows from a suitable implement applied to the driving end. The terminal is thereby driven into the hole of the conductor and during such driving the portion thereof near its surface is displaced by the wall around the hole, such displacement being permitted by the superficial grooves in the pin. The grooves are closed either partially or entirely during the driving operation thereby permitting the portion of the pin within the hole assuming a cylindrical form and closely engaging with the surface of the wall around the hole.

When the terminal is cylindrical, as shown in Fig. 4 in solid form, and in Fig. 8 in the form of a channel pin, the tapered superficial grooves permit the displacement of the surface as it is driven, so that the pin although of slightly greater diameter originally than the hole, passes through the hole and closely engages the wall surrounding the same. By making the grooves in the cylindrical terminal gradually decreasing in cross section from the beveled end towards the driving end, the portion of the pin which travels furthest relatively to the hole in the conductor is permitted to so contract as to permit the pin to be readily driven and at the same time insure a close contact between the surface thereof within the hole and the wall around the hole.

By providing the grooves in the tapered form of terminal with a decreasing cross section from the beveled end towards the driving head, the amount of contraction permitted varies according to the diameter thereby resulting in the portion of the terminal within the holes being cylindrical and uniformly contacting with the wall around the hole.

In order that a more permanent contact may be formed between the terminal and the conductor, the terminal may be coated with a soft metal, such as tin, lead, or Babbitt metal. In Fig. 3 B' indicates the coating which fills the grooves $a'$ while in Fig. 9 $B^3$ indicates the coating which fills the grooves $a^3$. As the terminals are driven and the groove thereby closed the soft metal of the coating is squeezed outwardly and forced against the wall around the hole of the conductor thereby insuring contact between the terminal and the wall around the hole along the lines of the grooves.

From the foregoing description it will be observed that I have invented terminals for a bond which may be readily driven into a cylindrical hole in a conductor and which when driven will form a uniform contact with the wall around the hole thereby reducing the resistance of the connection to a minimum. It will also be observed that I have invented an improved bond having terminals provided with superficial grooves thereby permitting the metal of the terminals to be so displaced when driven as to result in a close and uniform contact between the terminals and the walls around the holes into which they are driven.

Having now fully described my invention, what I claim as new and desire to secure by Letters Patent is:

1. A rigid terminal for an electrical bond adapted to be driven into a hole in a conductor and having shallow superficial grooves in the portion thereof which is adapted to engage with the wall surrounding the hole.

2. A terminal for an electrical bond adapted to be driven into a hole in a conductor and having tapered superficial grooves in the portion thereof adapted to enter the hole.

3. A tapered terminal for electrical bonds adapted to be driven in a hole in a conductor and having in the portion adapted to enter the hole a superficial groove tapered to correspond to the taper of the terminal.

4. A bonding pin for electrically uniting conductors having superficial grooves therein and having a coating of soft metal thereon.

5. A bond for electrically uniting conductors having a grooved terminal adapted to be driven in a hole in a conductor and having on said terminal a coating of soft metal.

6. A bond for electrically uniting conductors having an integral terminal, said terminal provided with tapered grooves.

7. A bond for electrically uniting conductors having a tapered terminal, said terminal having grooves therein corresponding to the taper of the terminal, and a coating of soft metal on said terminal filling the grooves therein.

8. A bond for electrically uniting conductors having a tapered terminal, said terminal having grooves therein, and a coating of soft metal on said terminal filling the grooves therein.

9. A bonding pin having a tapered groove extending lengthwise thereof.

10. A bonding pin having a tapered groove extending throughout the greater portion of the length thereof.

11. A bond for electrically uniting conductors having an integral terminal provided with a longitudinally extending tapered groove.

In testimony whereof, I sign this specification in the presence of two witnesses.

EUGENE W. VOGEL.

Witnesses:
   Geo. L. Wilkinson,
   C. A. Mullen.